UNITED STATES PATENT OFFICE.

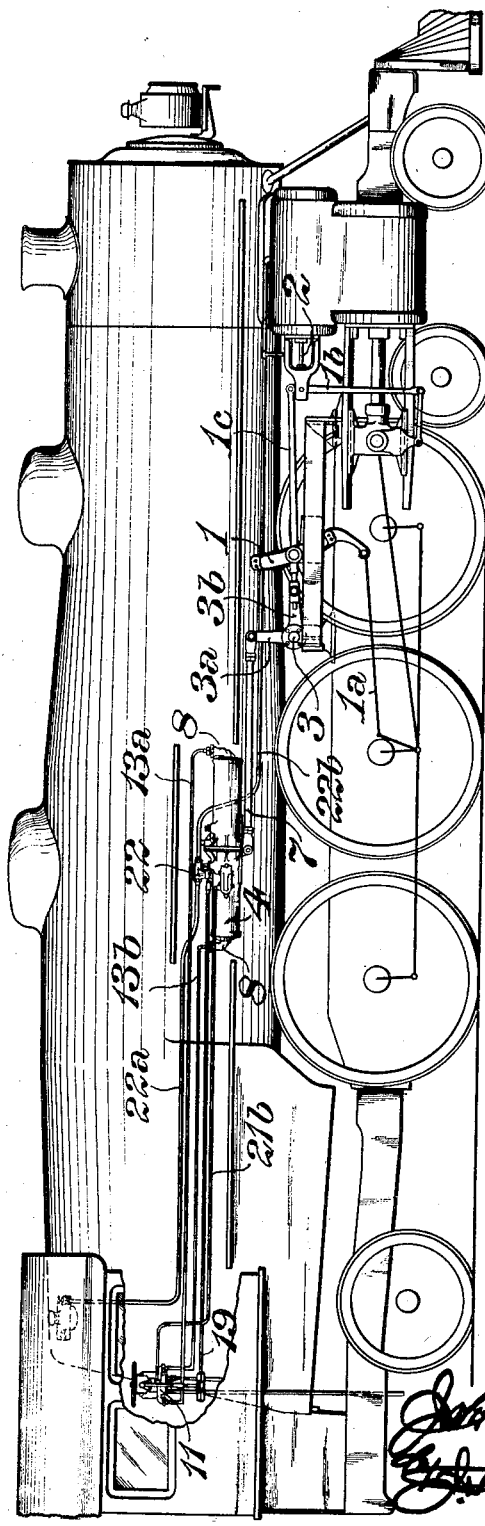

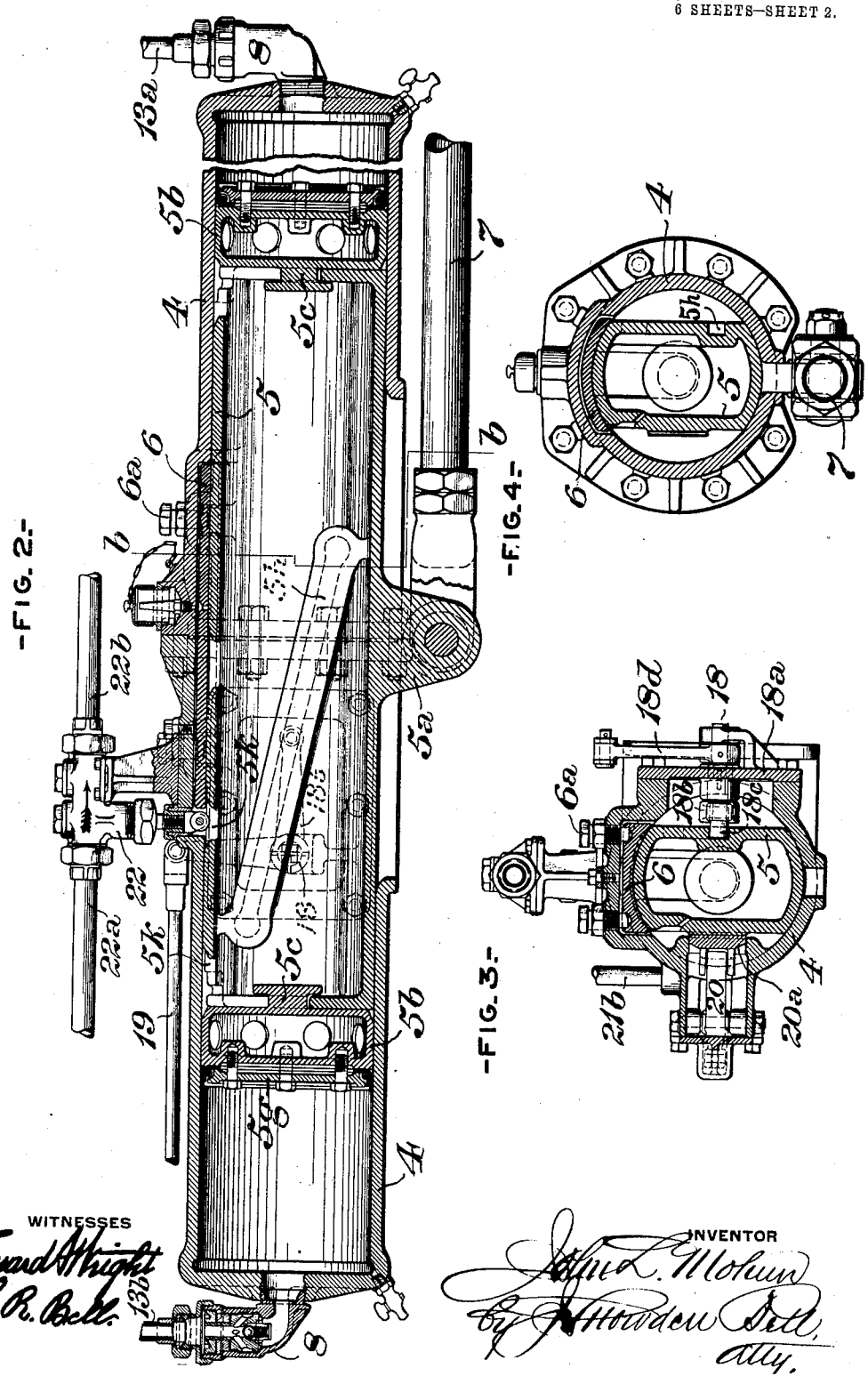

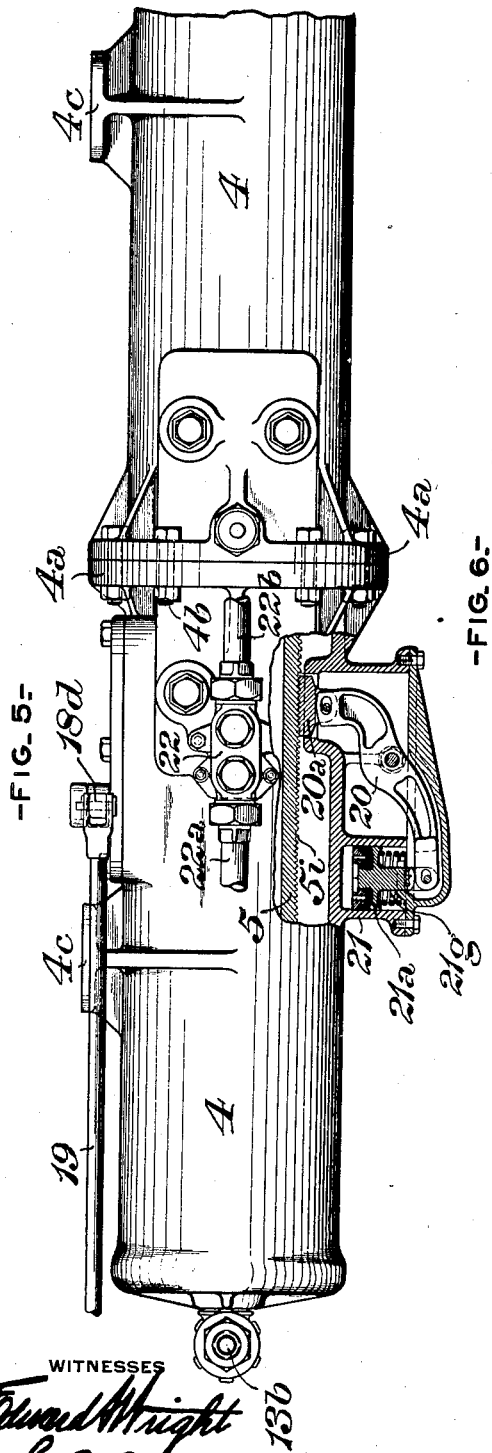
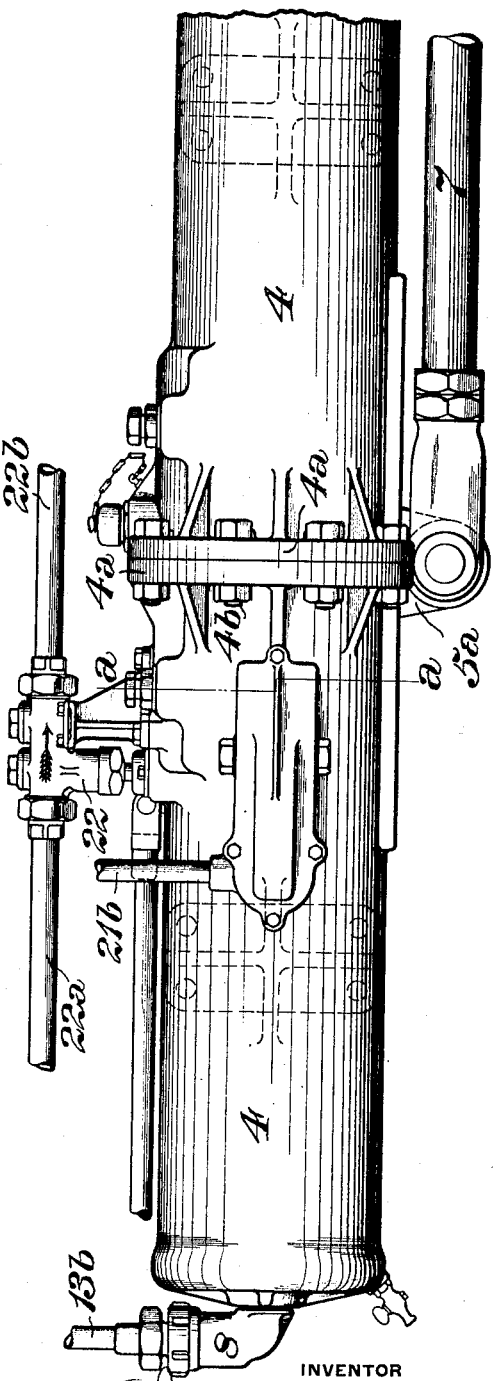

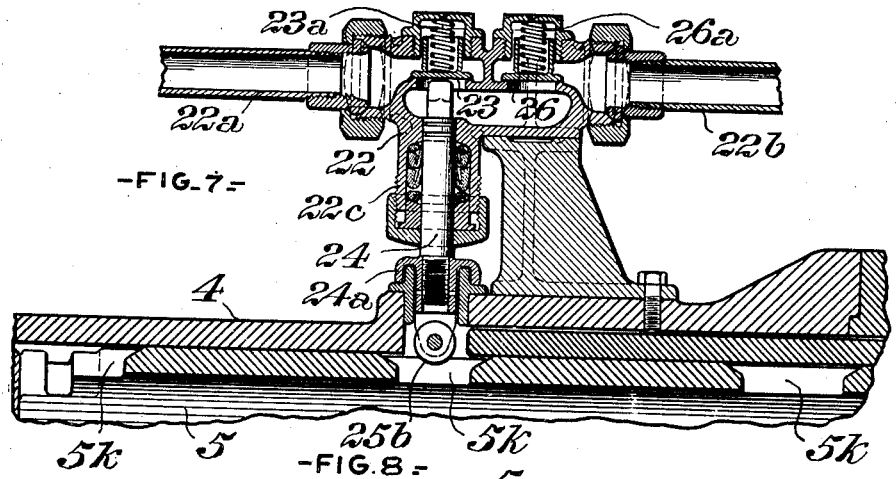
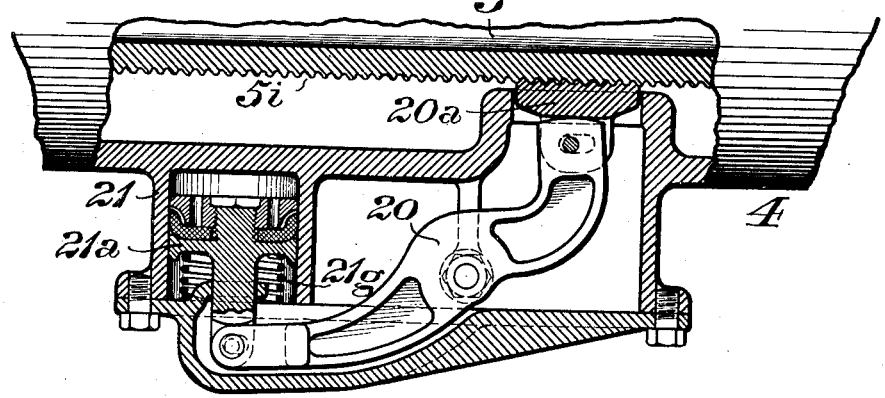
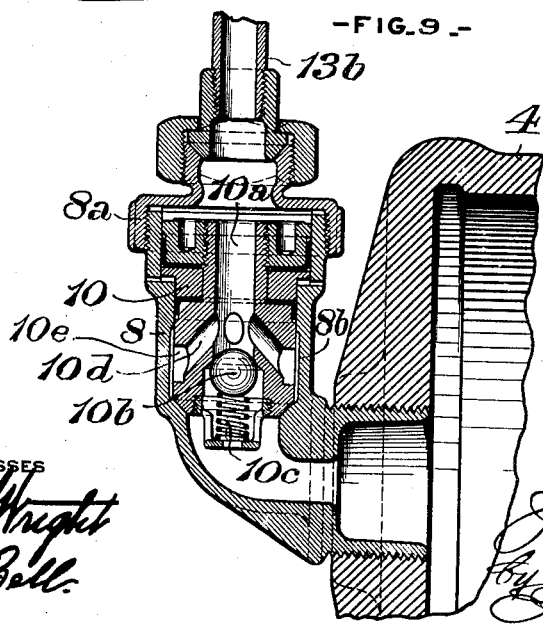

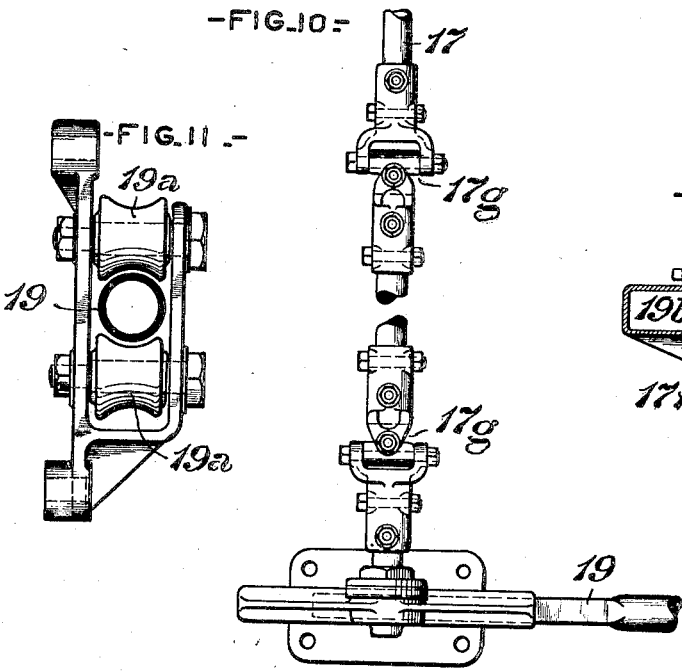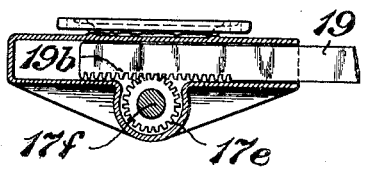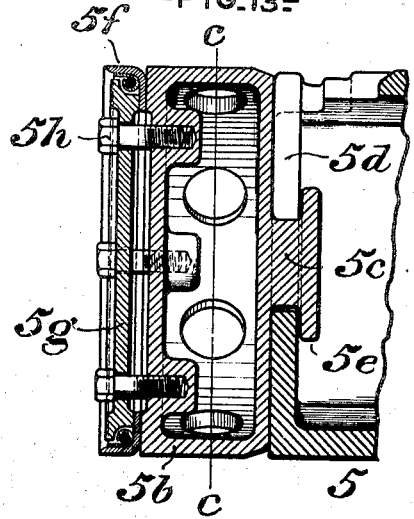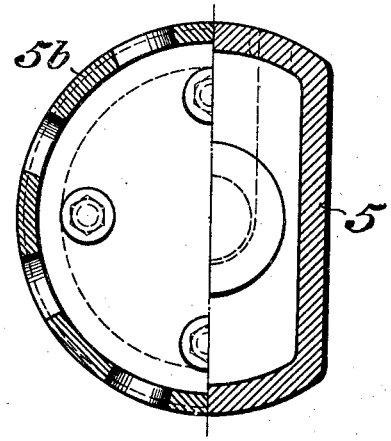

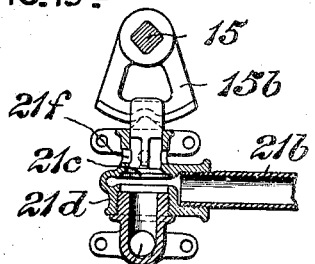
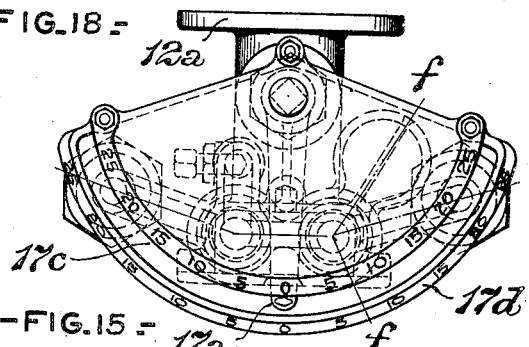
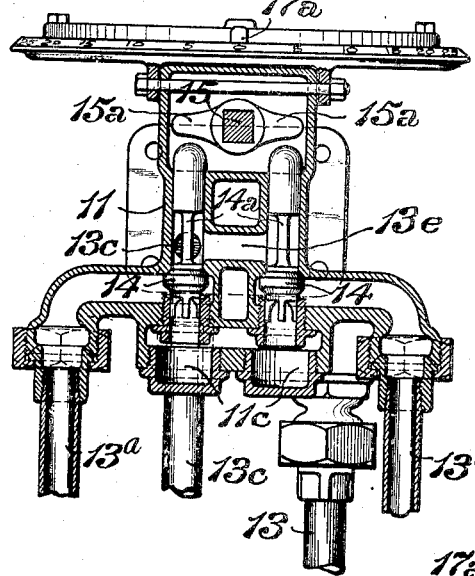
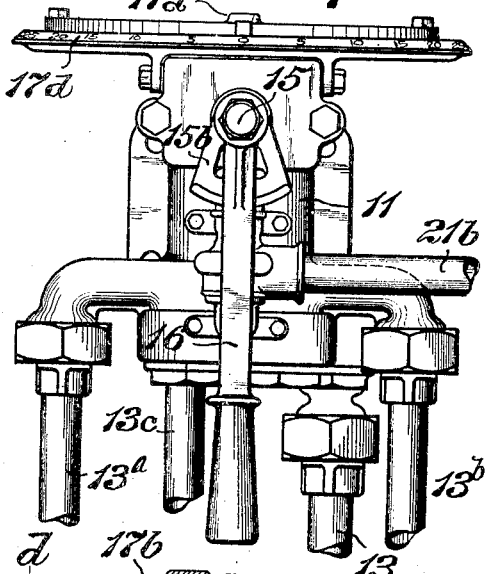
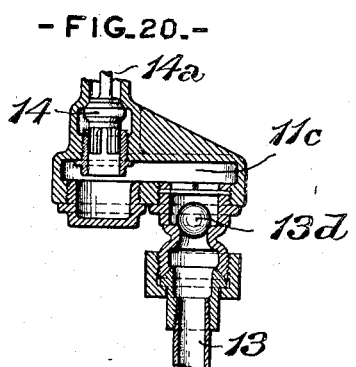
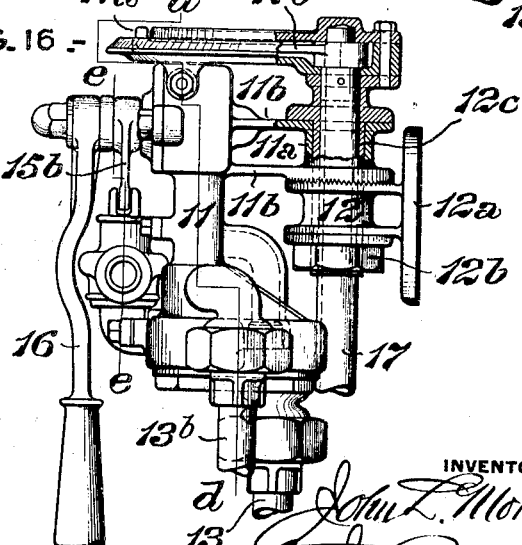

JOHN L. MOHUN, OF BROOKLYN, NEW YORK.

STEAM-ENGINE-VALVE-REVERSING GEAR.

1,084,286.   Specification of Letters Patent.   Patented Jan. 13, 1914.

Application filed November 1, 1913. Serial No. 798,609.

*To all whom it may concern:*

Be it known that I, JOHN L. MOHUN, of Brooklyn, in the county of Kings and State of New York, have invented a certain new and useful Improvement in Steam-Engine-Valve-Reversing Gear, of which improvement the following is a specification.

My invention relates to power actuated reversing gear for steam engine valve mechanisms, more particularly those of locomotives, and, generally stated, its object is to provide a power actuated reversing mechanism, by which the valve operating gears of locomotives of the largest classes may be adjusted for direction of motion and degree of expansion, with quickness, accuracy, and under perfect control of the engineman, whether the locomotive is standing or running at any speed; which shall be capable of maintaining the valve gear in any adjusted position, for an unlimited period; and which shall be thoroughly practical and desirable from the standpoints of manufacture, operation, and maintenance.

The improvement claimed is hereinafter fully set forth.

In the accompanying drawings: Figure 1 is a side view, in elevation, of a locomotive engine, illustrating, diagrammatically, the application of my invention in connection with a Walschaert valve gear; Fig. 2, a longitudinal central section through the reversing cylinder; Fig. 3, a transverse section through the same, on the line $a\ a$ of Fig. 6; Fig. 4, a similar section, on the line $b\ b$ of Fig. 2; Fig. 5, a plan view, partly in section, of the reversing cylinder; Fig. 6, a side view, in elevation, of the same; Fig. 7, a longitudinal central section, on an enlarged scale, through the drifting valve mechanism and the adjoining portion of the reversing cylinder; Fig. 8, a similar section through the positive locking mechanism; Fig. 9, a vertical central section through one of the valve mechanisms of the reversing cylinder; Fig. 10, a side view, in elevation, of the pinion shaft of the indicating mechanism; Fig. 11, an end view of the guiding device for the connecting member of said shaft and its actuating device; Fig. 12, a horizontal section, through said shaft and the pinion casing; Fig. 13, an axial section through one of the heads of the reversing cylinder piston; Fig. 14, a view, the left hand portion of which is a diametral or transverse section through said head, on the line $c\ c$ of Fig. 13, and the right hand portion a similar section through the piston in a plane near the head; Fig. 15, a front view, in elevation, of the control valve casing; Fig. 16, a view of the same, partly in section, taken at a right angle to Fig. 15; Fig. 17, a vertical section, on the line $d\ d$ of Fig. 16; Fig. 18, a plan view of the index plates; Fig. 19, a vertical section on the line $e\ e$ of Fig. 16; and, Fig. 20, a similar section, on the line $f\ f$ of Fig. 18.

Referring to the drawings, my invention, which is applicable in connection with any of the various known types of distribution valve actuating mechanism, is diagrammatically illustrated in Fig. 1 as applied for the adjustment and control of a Walschaert valve gear of the ordinary construction, which comprises a link, 1, eccentric rod, $1^a$, combination lever, $1^b$, and radius bar, $1^c$, and is coupled to a distribution valve stem, 2. The radius bar is coupled to the lower arm, $3^b$, of a reverse shaft, 3, and is raised and lowered throughout its range of traverse on the link, 1, by my improved reversing mechanism, hereinafter described, which is connected to the upper arm, $3^a$, of the reverse shaft.

In the practice of my invention, I provide a fluid pressure reversing cylinder 4, which is preferably located as near as practicable to the valve gear, and therefore at a substantial distance from the cab of the locomotive, in which the members of the manually operable controlling and indicating mechanism are installed. The reversing cylinder is formed in two sections, each of which is open at one end and closed by an integral head at the other, said sections being firmly secured together by bolts, $4^b$, passing through flanges, $4^a$, at their open ends, and being provided with lateral flanges, $4^c$, through which the cylinder is supported on the boiler or the frame of the locomotive as may be most convenient. A hollow piston, 5, is fitted to reciprocate in the reversing cylinder, and is provided, on its lower side, with a lug, $5^a$, which projects downwardly through a longitudinal slot in the middle portion of the cylinder, and is coupled, by a reach rod, 7, to the upper arm, $3^a$, of the reverse shaft, 3. A segmental gib, 6, which is adjusted by set screws, $6^a$, is interposed between the piston and the shell of the cylinder at the middle portion thereof, for the purpose of taking up wear between the piston and cylinder.

A "floating" head, 5$^b$, is connected with the capacity of a limited degree of relative adjustment, to each end of the piston, 5, the connection being effected, in the instance shown, by the engagement of a central cylindrical boss, 5$^c$, formed on the inner side of the head, 5$^b$, with a radial slot, 5$^d$, in the adjacent end wall of the piston. Relative longitudinal movement of the piston and head is prevented by a flange, 5$^e$, on the inner end of the boss, 5$^c$, which fits against the inner side of the end wall of the piston. The heads are provided with suitable packing rings, 5$^f$, which are held in position by followers, 5$^g$, secured to the heads by tap bolts, 5$^h$. By this construction, each of the heads is adapted to adjust itself to the bore of the cylinder, independently of the piston, and tendency to cramping is prevented.

The supply and exhaust of motive fluid to and from the opposite heads of the piston, 5, are effected by valve mechanisms which are fitted in valve chests, 8, secured detachably to the heads of the reversing cylinder, and open thereinto at one end, their opposite ends being closed by removable heads, 8$^a$, to each of which is secured a supply and exhaust conduit, 13$^a$ or 13$^b$, leading to and governed by a control valve mechanism, hereinafter described, in the cab of the locomotive. A differential piston valve, 10, is fitted in each of the valve chests, 8, said valve comprising upper and lower pistons, of larger and smaller diameters, respectively, each fitting a corresponding bore in the valve chest, and the lower piston having a conical face on its lower end which seats on a corresponding face in the valve chest. A central passage, 10$^a$, is formed in the valve, said passage being controlled, at its lower end, by an inwardly opening check valve, 10$^b$, which is normally held seated by a light spring, 10$^c$. The passage, 10$^a$, is connected, by a plurality of ports, 10$^d$, with an annular recess, 10$^e$, in the lower piston of the valve, which recess is continuously open to a plurality of longitudinal grooves, 8$^b$, in the lower bore of the valve.

Upon the admission of fluid under pressure to the valve chest, through the pipe, 13$^a$ or 13$^b$, the valve, 10, is forced to its seat, and the check valve, 10$^b$, is unseated, thereby admitting pressure to the adjacent end of the reversing cylinder. Upon the release of pressure in the connected pipe, 13$^a$ or 13$^b$, the valve is unseated by the pressure in the reversing cylinder, which pressure is released, through the grooves, 8$^b$, ports, 10$^d$, and passage, 10$^a$, to the connected pipe, 13$^a$ or 13$^b$. In the event of leakage past the adjacent piston head, 5$^b$, the check valve, 10$^b$, is unseated, and pressure to compensate for such leakage is automatically admitted to the reversing cylinder.

The admission and exhaust of motive fluid through the pipes, 13$^a$ and 13$^b$, and valve chests, 8, to and from the piston heads, 5$^b$, are effected by a manually actuated control valve mechanism, which is located in the cab of the locomotive, a suitable and preferred form of which, shown in the drawings, is of the following construction. A valve casing, 11, is secured adjustably to a tubular support, 12, having a lateral flange, 12$^a$, through which it may be attached to the side of the firebox or any other suitable fixed member in the cab. A tubular bearing, 11$^a$, is formed integral with plates, 11$^b$, projecting from the valve casing, said bearing having a toothed or serrated face, fitting a corresponding face on the support, 12. The position of the valve casing may be adjusted as desired by moving it about the axis of the support, and it is secured in adjusted position by a nut, 12$^b$, engaging a tubular bolt, 12$^c$, passing centrally through the support.

Fluid under pressure, as, preferably, compressed air, is admitted to a supply chamber, 11$^c$, in the valve casing through a supply pipe, 13, which leads from a reservoir or other suitable source of supply, and is provided with an inwardly opening check valve, 13$^d$, and which may also be controlled by a cock or valve, for the purpose of cutting off fluid from the valve casing during examination or repair of the contained members. Fluid pressure supply and exhaust pipes or conduits, 13$^a$, 13$^b$, lead from the valve casing, to the forward and rear valve chests, 8, respectively, of the reversing cylinder, and an exhaust pipe, 13$^e$, leads from an exhaust chamber, 13$^e$, in the valve casing to any convenient point of discharge. Communication between the conduits, 13$^a$ and 13$^b$, and the supply and exhaust chambers, respectively, is controlled by two valves, 14, of the puppet type, each of which is fixed to a stem, 14$^a$, fitting a vertical guide in the exhaust chamber, and is provided with upper and lower conical faces, adapted to fit corresponding seats in the exhaust and supply chambers, respectively. The valves, 14, are normally held to their exhaust chamber seats by the pressure on their lower sides, thereby establishing communication between the supply chamber and each of the valve chests of the reversing cylinder, and cutting off communication between said valve chests and the exhaust chamber, and either valve is unseated as desired, to effect a reversed direction of communication, by an operating shaft, 15, journaled in the valve casing, 11, and having two oppositely extending arms, 15$^a$, each of which is adapted to abut against the adjacent valve stem, 14$^a$, and thereby to depress the valve from its exhaust chamber seat and bring it to a bearing on its supply chamber seat, when moved downwardly by rocking the operating shaft in its bearings. The required movements are imparted to the operating shaft by a control lever, 16, fixed on one end thereof and projecting downwardly on the outer side of the valve casing, 11.

The position of the valve gear, as adjusted for direction of movement of the locomotive and degree of expansion or point of cut off, is indicated to the engineman by a pointer, 17$^a$, which is fixed upon an arm, 17$^b$, on the upper end of a vertical indicator shaft, 17, passing through and guided in the tubular support, said pointer traversing in front of a horizontal index plate, 17$^c$, fixed to the top of the valve casing, 11, and marked in figures corresponding with the points of cut off, in each direction from a middle zero point. To facilitate inspection, a supplemental index plate, 17$^d$, having a similarly marked downwardly inclined face, may be, as shown, located in front of the index plate, 17$^c$.

Movement about its axis, in either direction, is imparted to the indicator shaft, by the movement of the piston, 5, in the adjustment of the reversing gear, through a rock shaft, 18, which is journaled in a plate, 18$^a$, secured detachably to, and covering an opening in the inner side of the reversing cylinder, 4. The rock shaft, 18, carries a lower arm, 18$^b$, on the outer end of which there is fixed a pin, 18$^c$, which works in an inclined groove, 5$^k$, formed on one side of the piston, 5, and thereby raises or lowers the arm, 18$^b$, from a horizontal position which it occupies when the piston is at the middle of its stroke, according to the direction of movement of the piston. An upper arm, 18$^d$, fixed on the rock shaft, is coupled to a rod or tube, 19, which extends rearwardly, and is supported and guided by and between a pair of guide rollers, 19$^a$. A rack, 19$^b$, formed at the rear end of the rod, 19, engages a pinion, 17$^e$, fixed on a short vertical shaft, 17$^f$, which is connected, by universal joint couplings, 17$^g$, to the indicator shaft, 17, which, through the connections above described, is moved in direction and range corresponding with the reciprocating movements of the piston, 5, of the reversing cylinder.

The reversing mechanism is locked in any and all adjusted positions by the maintenance of an equilibrium of pressure on the opposite heads of the piston, 5, which are normally, that is, in all adjusted positions, equally exposed thereto by reason of both the valves, 14, being, in such positions, held off their seats in the supply chamber of the valve casing, 11. An additional positive locking mechanism may also, if desired, be provided, this, in the instance shown, comprising a double armed locking lever, 20, which is pivoted to the reversing cylinder, a toothed or serrated latch, 20$^a$, coupled to one arm of the locking lever and adapted to engage teeth or serrations, 5$^l$, on the piston, 5, and a fluid pressure locking cylinder, 21, having a piston, 21$^a$, which is coupled to the other arm of the locking lever. Fluid under pressure is admitted to and exhausted from the locking cylinder, through a pipe, 21$^b$, which is controlled by a valve, 21$^c$, fitted in a casing, 21$^d$, to which fluid is supplied through a port, 21$^e$, and from which it is exhausted through exhaust ports, 21$^f$. The valve, 21$^c$, is normally seated to open communication between the supply port, 21$^e$, and the locking cylinder pipe, 21$^b$, and to close communication between the locking cylinder pipe and the exhaust ports. A cam, 15$^b$, fixed on the operating shaft, 15, abuts against the stem of the valve, 21$^c$, and when said shaft is rocked by the control lever, 16, to effect an adjustment of the valve gear, depresses the valve from its upper seat and forces it to a closure in the supply pipe connection, thereby closing communication between the locking cylinder pipe and the supply pipe, and releasing pressure from the locking cylinder through the exhaust ports, 21$^f$. Upon the release of pressure therefrom, the latch, 20$^a$, is released from the teeth, 5$^l$, of the piston, 5, by a releasing spring, 21$^g$, bearing on the piston, 21$^a$, of the locking cylinder.

In order to provide for the admission of a limited volume of steam to the cylinders, while the locomotive is "drifting," or running with the throttle valve closed, for the purpose of preventing the formation of a vacuum, and the resultant entrance of hot gases and cinders from the smoke box, as well as to effect lubrication and prevent the carbonization of oil in the cylinders, a drifting valve mechanism which is automatically operated by the movements of the piston in effecting adjustments of the valve gear, is provided, which mechanism is of the following construction.

A valve casing, 22, is secured to the reversing cylinder, 4, and is connected at one end, by a supply pipe, 22$^a$, with the steam space of the locomotive, preferably through a small steam dome or turret in the ordinary manner. The opposite end of the valve casing is connected, by a delivery pipe, 22$^b$, with one of the steam induction passages of each of the locomotive cylinders, or with each of the valve chests. Communication between the pipes, 22$^a$ and 22$^b$, is controlled by a valve, 23, which opens toward the pipe, 22$^a$, and is normally held seated by the pressure on its upper surface and by a spring, 23$^a$. A rod or stem, 24, extends through a stuffing box, 22$^c$, on the valve casing, the upper end of said stem being located in position to unseat the valve, 23, when the stem is raised, and a block, 24ª, is secured to the lower end of the stem, said block being fitted to slide in an opening in the reversing cylinder, at a right angle to the line of traverse of the piston, 5, and carrying a friction roller, 25ᵇ, the periphery of which projects into the reversing cylinder. Three slots, 5ᵏ, the upper portions of the ends of which are outwardly inclined, are formed in the piston, 5, said slots being so located that when the piston is at the middle of its stroke, a portion of the roller, 25ᵇ, will stand within the middle slot, and when the piston has been moved in either direction to a position in which the valve gear is adjusted for the admission of steam between full stroke and a determined point of cut off, as say four inches, a portion of the roller will stand in one of the other two slots.

In the movement of the piston, the stem is raised by the contact of one of the inclined sides of the slot in which the roller may be standing, with the periphery of the roller, thereby unseating the valve, 23, and admitting steam directly from the boiler to the cylinders. This direct admission of steam will be maintained, during the period that the throttle is closed, until the piston is moved to a position corresponding with steam admission between full stroke and the determined point of cut off, when the roller will drop into another of the slots, and the valve, 23, will be seated, thereby stopping the direct admission of steam. In order to prevent the admission of saturated steam to the cylinders, when the locomotive is running with the throttle open and using superheated steam, a check valve, 26, which opens in the direction of the delivery pipe, 22ᵇ, is interposed between said pipe and the valve, 23, said valve, 26, being held seated by the steam pressure on its surface during the periods in which the throttle is open, and by a spring, 26ª.

In the operation of the reversing mechanism, assuming the parts to be in middle gear positions, and it is desired to move the distribution valves of the locomotive into position for forward movement, and it being understood that the reversing mechanism is locked in position by fluid under equal pressures inclosed in the reversing cylinder at the opposite ends of the piston, as well as by the locking cylinder, and its accessories before described, when the same are applied, the engineman moves the control lever, 16, forward, thereby first cutting off the supply of fluid from the locking cylinder, 21, and then exhausting fluid therefrom, whereupon the spring, 21ᵍ; releases the latch, 20ª, from its engagement with the piston, 5, and leaves the latter free to be moved. The further movement of the control lever seats the valve, 14, controlling the pipe, 13ª, leading to the forward end of the reversing cylinder, to the supply chamber of the valve casing, 11, and unseats said valve to the exhaust chamber, the valve controlling the pipe, 13ᵇ, remaining open to the supply chamber, thereby maintaining supply of motive fluid to the opposite end of the reversing cylinder. Upon the ensuing release of pressure from the larger piston of the valve in the chest, 8, at the forward end of the reversing cylinder, said valve is unseated by the pressure on its smaller piston and the fluid under pressure in the forward end of the reversing cylinder is exhausted through the pipe, 13ª. Fluid under pressure is coincidently supplied to the rear end of the reversing cylinder, by the unseating of the check valve, 10ᵇ, of the rear valve chest, 8, and the piston, 5, is moved forward, correspondingly moving the reach rod, 7, and connected reverse shaft arm, and rotating the indicator shaft, 17. When the position of the pointer, 17ª, indicates that the desired adjustment of the valve gear has been made, the engineman returns the control lever to its middle position, thereby admitting pressure to both ends of the reversing cylinder and locking the gear in adjusted position. The locking latch, when applied, is also moved into engagement with the piston. Adjustments in back gear are similarly effected by rearward movements of the control lever.

The practical advantages of my improved reversing mechanism, hereinbefore described, comprehend: (a), simplicity and inexpensiveness of construction and maintenance, and durability in service, by reason of the comparatively limited number of wearing parts; (b), facility of installation and operation in connection with valve gears of any of the present types; (c), embodiment of a self contained actuating mechanism without cross head or guides, which is exempt from liability to be worked out of alinement by expansion and contraction or twisting movements of the frame members of the locomotive; (d), exemption from the liability to leakage which is experienced in constructions containing piston rod stuffing boxes and slide valves; (e), capacity of being automatically locked in adjusted position by maintenance of equalization of pressure on opposite sides of an operating piston; (f), capacity of as rapid operation as desired, the speed of the movements of the piston being regulable by the size of the cylinder supply and exhaust passages; (g), provision of a coincidently operable drifting valve mechanism.

It will be obvious to those familiar with the construction of locomotive engines, that various modifications of structural detail may be made, in the discretion of a skilled constructor, without departure from the spirit and operative principle of my invention, and I do not therefore limit myself to the specific embodiment thereof which is herein described and shown.

I claim as my invention and desire to secure by Letters Patent:—

1. In a valve reversing mechanism, the combination of a reversing cylinder, a piston fitted therein and adapted for connection to a reverse shaft, and valve mechanisms, each controlling the supply and exhaust of motive fluid to and from one end of the reversing cylinder, said valve mechanisms being manually operable to effect desired movements of the piston and automatically operable, independently of piston movement, to maintain equilibrium of pressures on the opposite ends of the piston in adjusted positions thereof.

2. In a valve reversing mechanism, the combination of a reversing cylinder, a piston fitted therein and adapted for connection to a reverse shaft, valve mechanisms each controlling the supply and exhaust of motive fluid to and from one end of the reversing cylinder, and manually operable means for preliminarily instituting a difference of pressures, through said valve mechanisms, in the opposite ends of the reversing cylinder, to effect desired movement of the piston, and subjecting said valve mechanisms to equal pressures at the terminal of such movement, to automatically maintain equilibrium of pressures in the opposite ends of the reversing cylinder in any adjusted position of the piston.

3. In a valve reversing mechanism, the combination of a reversing cylinder, a piston fitted therein and adapted for connection to a reverse shaft, valve mechanisms, each governing the supply and exhaust of motive fluid to and from one end of the reversing cylinder and adapted to automatically compensate leakage therefrom, and manually operable means for supplying and exhausting motive fluid to and from said valve mechanisms.

4. In a valve reversing mechanism, the combination of a reversing cylinder, a piston fitted therein and adapted for connection to a reverse shaft, differential piston valve mechanisms, each governing the supply and exhaust of motive fluid to and from one end of the reversing cylinder, a manually operable control valve mechanism, and conduits through which motive fluid is supplied from the control valve mechanism to each of the larger pistons of the governing valve mechanisms, to maintain an equilibrium of pressures in the opposite ends of the reversing cylinder, and exhausted from either of said pistons as desired, to institute a difference of pressures in the opposite ends of the reversing cylinder by the action of the pressure in one end thereof upon the smaller piston of the adjacent governing valve mechanism.

5. In a valve reversing mechanism, the combination of a reversing cylinder, a piston fitted therein and adapted for connection to a reverse shaft, governing valve mechanisms, each connected to one end of the reversing cylinder and comprising a casing, a piston valve seating therein, and a valve controlling a passage through said piston valve, and manually operable means for supplying and exhausting motive fluid to and from said valve mechanisms.

6. In a valve reversing mechanism, the combination of a reversing cylinder, a piston fitted therein and adapted for connection to a reverse shaft, governing valve mechanisms, each connected to one end of the reversing cylinder and comprising a casing, a differential piston valve seating therein, and a check valve controlling a passage through said piston valve, a manually operable control valve mechanism, and conduits through which motive fluid is supplied to and exhausted from the casings of the governing valve mechanisms, by the actuation of the control valve mechanism.

7. In a valve reversing mechanism, the combination of a reversing cylinder, a piston fitted therein and adapted for connection to a reverse shaft, valve mechanisms, each governing the supply and exhaust of motive fluid to and from one end of the reversing cylinder, a control valve mechanism comprising a casing having a supply chamber adapted for connection to a source of fluid pressure, an exhaust chamber open to the atmosphere, connections, intermediate of said chambers, for conduits leading to the governing valve mechanisms of the reversing cylinder, two valves, each controlling communication between said connections and the supply and exhaust chambers, a vibratable operating shaft having arms for unseating said valves, and a control lever fixed on said shaft, and conduits, each leading from one of the governing valve mechanisms to one of the connections of the control valve mechanism casing.

8. In a valve reversing mechanism, the combination of a reversing cylinder, a piston fitted therein and adapted for connection to a reverse shaft, means for maintaining an equilibrium of pressures in the opposite ends of the reversing cylinder in all adjusted positions of the piston and instituting a difference of pressures to effect movement thereof, and means, actuated by the movement of the piston, for indicating adjusted positions of the valve gear.

9. In a valve reversing mechanism, the combination of a reversing cylinder, a piston fitted therein and adapted for connection to a reverse shaft, an indicator shaft, a pointer fixed thereon, a rock shaft journaled on the reversing cylinder and having an arm engaging an inclined groove on the piston, and connections coupling said rock shaft to the indicator shaft.

10. In a valve reversing mechanism, the combination of a reversing cylinder, a piston fitted therein and adapted for connection to a reverse shaft, an indicator shaft, a pointer fixed thereon, a rock shaft journaled on the reversing cylinder and having an arm engaging an inclined lateral groove on the piston, a rod coupled to another arm on said rock shaft, a rack formed on said rod, and a pinion fixed on the indicator shaft and engaging said rack.

11. In a valve reversing mechanism, the combination of a reversing cylinder, a piston fitted therein and adapted for connection to a reverse shaft, a manually operable control valve mechanism effecting the supply and exhaust of motive fluid to and from opposite ends of the reversing cylinder, an index plate supported above the casing of the control valve mechanism, an indicator shaft journaled adjacent to said casing, a pointer fixed on said shaft and adapted to traverse above the index plate, and connections through which the indicator shaft is swung in its bearings by, and coincidently with, the movements of the piston.

12. In a valve reversing mechanism, the combination of a reversing cylinder, a piston fitted therein and adapted for connection to a reverse shaft, a support adapted to be fixed in the cab of a locomotive, an indicator shaft journaled in said support, a control valve mechanism casing connected adjustably to said support, an index plate connected to the casing, a pointer fixed on the indicator shaft and adapted to traverse above the index plate, means for effecting the supply and exhaust of motive fluid from the control valve mechanism casing to and from opposite ends of the reversing cylinder, a manually operable control lever actuating the control valve mechanism, and connections through which the indicator shaft is swung in its bearings by, and coincidently with, the movements of the piston.

13. In a valve reversing mechanism, the combination of a reversing cylinder, a piston fitted therein and adapted for connection to a reverse shaft, means for effecting the supply and exhaust of motive fluid to and from opposite ends of the reversing cylinder, fluid pressure actuated mechanism for locking the piston in adjusted position, a control valve mechanism actuating the supply and exhaust means, a control lever operating said mechanism, and a valve actuated by said lever and controlling the supply and exhaust of motive fluid to and from the locking mechanism.

14. In a valve reversing mechanism, the combination of a reversing cylinder, a piston fitted therein and adapted for connection to a reverse shaft, means for effecting the supply and exhaust of motive fluid to and from opposite ends of the reversing cylinder, a fluid pressure locking cylinder, a piston fitting therein, a double armed locking lever having a latch on one of its ends adapted to engage teeth on the piston of the reversing cylinder and having an opposite arm subject to the pressure exerted in the locking cylinder, a releasing spring bearing on said arm in opposite direction to the action of the pressure in the locking cylinder, a control valve mechanism actuating the supply and exhaust means of the reversing cylinder, a control lever operating said mechanism, and a valve actuated by said lever and controlling the supply and exhaust of motive fluid to and from the locking cylinder.

15. In a valve reversing mechanism, the combination of a reversing cylinder, a piston fitted therein and adapted for connection to a reverse shaft, means for effecting the supply and exhaust of motive fluid to and from opposite ends of the reversing cylinder, and means, actuated by the movements of the piston, for admitting a limited volume of steam directly from the boiler of the locomotive to the cylinders.

16. In a valve reversing mechanism, the combination of a reversing cylinder, a piston fitted therein, and having a plurality of longitudinally disposed inclined ended slots, a reach rod connected to said piston and adapted for connection to a reverse shaft, means for effecting the supply and exhaust of motive fluid to and from opposite ends of the reversing cylinder, a valve controlling direct communication from the boiler of a locomotive to the cylinders, and a stem adapted to project into the slots of the piston and to be raised therefrom and unseat the valve in and by the movements of the piston.

17. In a valve reversing mechanism, the combination of a reversing cylinder, a piston fitted therein and adapted for connection to a reverse shaft, and floating heads, each connected, with the capacity of relative adjustment, to the piston.

18. In a valve reversing mechanism, the combination of a longitudinally slotted reversing cylinder, and a piston fitted therein and having a lug projecting through the slot of the reversing cylinder and adapted for connection to a reverse shaft.

19. In a valve reversing mechanism, the combination of a reversing cylinder, a piston fitted therein and adapted for connection to a reverse shaft, a gib interposed between the cylinder and piston, and means for adjusting the bearing of said gib on the piston.

20. In a valve reversing mechanism, the combination of a longitudinally slotted reversing cylinder, a piston fitted therein and having a lug projecting through the slot of the reversing cylinder and adapted for connection to a reverse shaft, floating heads, each connected with the capacity of relative movement, to the piston, a gib interposed between the cylinder and piston and extending longitudinally between the floating heads, and means for adjusting the bearing of said gib on the piston.

JOHN L. MOHUN.

Witnesses:
C. L. WINCY,
W. H. COYLES.